United States Patent
Panich et al.

(10) Patent No.: US 9,078,028 B2
(45) Date of Patent: Jul. 7, 2015

(54) METHOD AND DEVICE FOR CREATING AND MAINTAINING SYNCHRONIZATION BETWEEN VIDEO SIGNALS

(71) Applicant: ATI Technologies, ULC, Markham (CA)

(72) Inventors: Alexander Panich, Richmond Hill (CA); Syed Athar Hussain, Scarborough (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 0 days.

(21) Appl. No.: 13/645,020

(22) Filed: Oct. 4, 2012

(65) Prior Publication Data

US 2014/0098849 A1    Apr. 10, 2014

(51) Int. Cl.
| | |
|---|---|
| G06F 3/12 | (2006.01) |
| H04N 21/43 | (2011.01) |
| H04N 13/04 | (2006.01) |
| H04N 21/41 | (2011.01) |
| G06F 3/14 | (2006.01) |
| G09G 5/12 | (2006.01) |
| H04N 21/436 | (2011.01) |
| H04N 21/4402 | (2011.01) |

(52) U.S. Cl.
CPC ....... *H04N 21/4122* (2013.01); *H04N 13/0497* (2013.01); *G06F 3/1446* (2013.01); *G06F 3/1423* (2013.01); *G09G 5/12* (2013.01); *H04N 21/4307* (2013.01); *H04N 21/436* (2013.01); *H04N 21/44029* (2013.01)

(58) Field of Classification Search
CPC ............... G06F 3/1438; G06F 3/1446; G06F 17/30817; G06F 17/3087; G06F 3/1423; G09G 5/12; H04N 21/4307; H04N 13/0497
See application file for complete search history.

(56) References Cited

U.S. PATENT DOCUMENTS

| | | | |
|---|---|---|---|
| 2009/0110370 A1* | 4/2009 | Shibata | 386/102 |
| 2011/0090399 A1* | 4/2011 | Whitaker et al. | 348/500 |
| 2011/0164118 A1* | 7/2011 | Choi et al. | 348/51 |
| 2011/0216082 A1* | 9/2011 | Caskey et al. | 345/560 |
| 2012/0075334 A1* | 3/2012 | Pourbigharaz et al. | 345/619 |
| 2014/0022457 A1* | 1/2014 | Derer | 348/536 |

\* cited by examiner

*Primary Examiner* — Idriss N Alrobaye
*Assistant Examiner* — Ronald Modo
(74) *Attorney, Agent, or Firm* — Faegre Baker Daniels LLP

(57) ABSTRACT

A method and device for providing synchronized data output is provided. The method includes generating two data streams sending data to be presented in synchronization. Both streams are generated by the same processor-based device. The first data stream follows a first protocol and the second data stream follows a second (different) protocol. The processor of the processor-based device adjusts a data rate of the second data stream to cause a reduction in any timing offset between the streams.

30 Claims, 2 Drawing Sheets

METHOD AND DEVICE FOR CREATING AND MAINTAINING SYNCHRONIZATION BETWEEN VIDEO SIGNALS

FIELD OF THE DISCLOSURE

The present disclosure is related to methods and devices for providing video streams to multiple panels. The present disclosure is related more specifically to methods and devices for ensuring synchronization between multiple panels where the panels utilize different protocols.

BACKGROUND

When video output from a computer is provided to multiple display panels, multiple video streams are created between one or more graphics display boards and the display panels. If the multiple panels are the same, the properties of the generated video streams that supply them can be the same (resolution, refresh rate, etc.). However, if one wishes to provide outputs to panels that are different from each other, the video streams are often different. Furthermore, different interfaces and protocols can be used for the different display panels which also cause differences in the video streams. For example, if one display is being supplied data using HDMI, one display is being supplied using DVI and another display is being supplied using DisplayPort, the hardware driving the outputs to these displays may need to use different hardware blocks to set up the various video streams. Similarly, two streams of the same protocol that are being sent to two different displays that support different resolutions also require divergent streams. Also, two streams of different protocols that are being sent to similar displays (or both to a single display) also require different streams. By way of further example, AMD Eyefinity technology supports up to six simultaneous displays off of a single graphics card. Eyefinity supports display outputs of DVI, DisplayPort, miniDisplayPort, HDMI, and VGA.

The differences in the video streams result in a difference in bit rates of the data being output to the panels. This difference in bit rates provides a lack of synchronicity. While the difference may be small, as the displays continue to run, the small differences begin to accumulate until the displayed images are out of synchronization by such a margin that it becomes noticeable. Specifically, the lack of synchronicity presents problems for users who can see both streams (such as in multi-screen or single screen 3D applications) or where multiple users need to perceive the video simultaneously (such as when there is a common audio stream projected to the viewers of the multiple screens).

When there is a lack of synchronization between video streams, clock pulses that drive the video streams are each firing at different times. Accordingly, other processes that look to operate on the streams or use the stream data (such as memory controllers) need to run relatively frequently to be sure and pick up current data. By way of example, video streams contain blank and active regions. The active regions are the portions that need to be fetched. If streams are not synchronized, then blank regions of one stream can occur while an active region is present for another stream. Thus, clock speeds must be maintained at all times in that an active region can be present at any time.

If the streams are synchronized, then other processes can run at a similar clock pulse and know that the process is aligned with the stream data. In this manner, the other processes can use a lower clock speed, thereby saving power. Again using the above example, when streams are synchronized, it can be determined when active regions are present in the streams and when blank regions are present in the streams. Furthermore, the active and blank regions for the streams are likewise synchronized. Thus, during blank regions, a lower clock speed can be applied.

Synchronization of different streams is currently possible through the use of additional hardware modules. Such modules include the S400 synchronization module and the NVIDIA® Quadro® G-Synch. However, these synchronization modules are provided for synchronizing signals from different stream sources (GPU's, etc).

Accordingly, there exists a need for a device and method to provide different video streams from a common source that operate so as to appear synchronous.

DETAILED DESCRIPTION OF EMBODIMENTS

In an exemplary and non-limited embodiment, aspects of the invention are embodied in a method of providing data output. The method includes generating two data streams sending data to be presented in synchronization. Both streams are generated by the same processor-based device. The first data stream follows a first protocol and the second data stream follows a second (different) protocol. The processor of the processor-based device adjusts a data rate of the second data stream to cause a reduction in any timing offset between the streams.

In another exemplary embodiment, a graphics controller is provided including a processor operable to generate a first data stream sending first data and a second data stream sending the first data, the first data stream following a first protocol and the second data stream following a second protocol that is different from the first protocol. A second display controller is operable to adjust a data rate of the second data stream to cause a reduction in any temporal offset between the streams.

In another exemplary embodiment, a computer readable medium containing non-transitory instructions thereon is provided, that when interpreted by at least one processor cause the at least one processor to: compare a first data stream sending first data to a second data stream sending the first data to determine the degree to which transmission of the first data in each of the streams is temporally offset, the first data stream following a first protocol and the second data stream following a second protocol that is different from the first protocol; and adjust a data rate of the second data stream to cause a reduction in any temporal offset between the streams.

Figure 1:
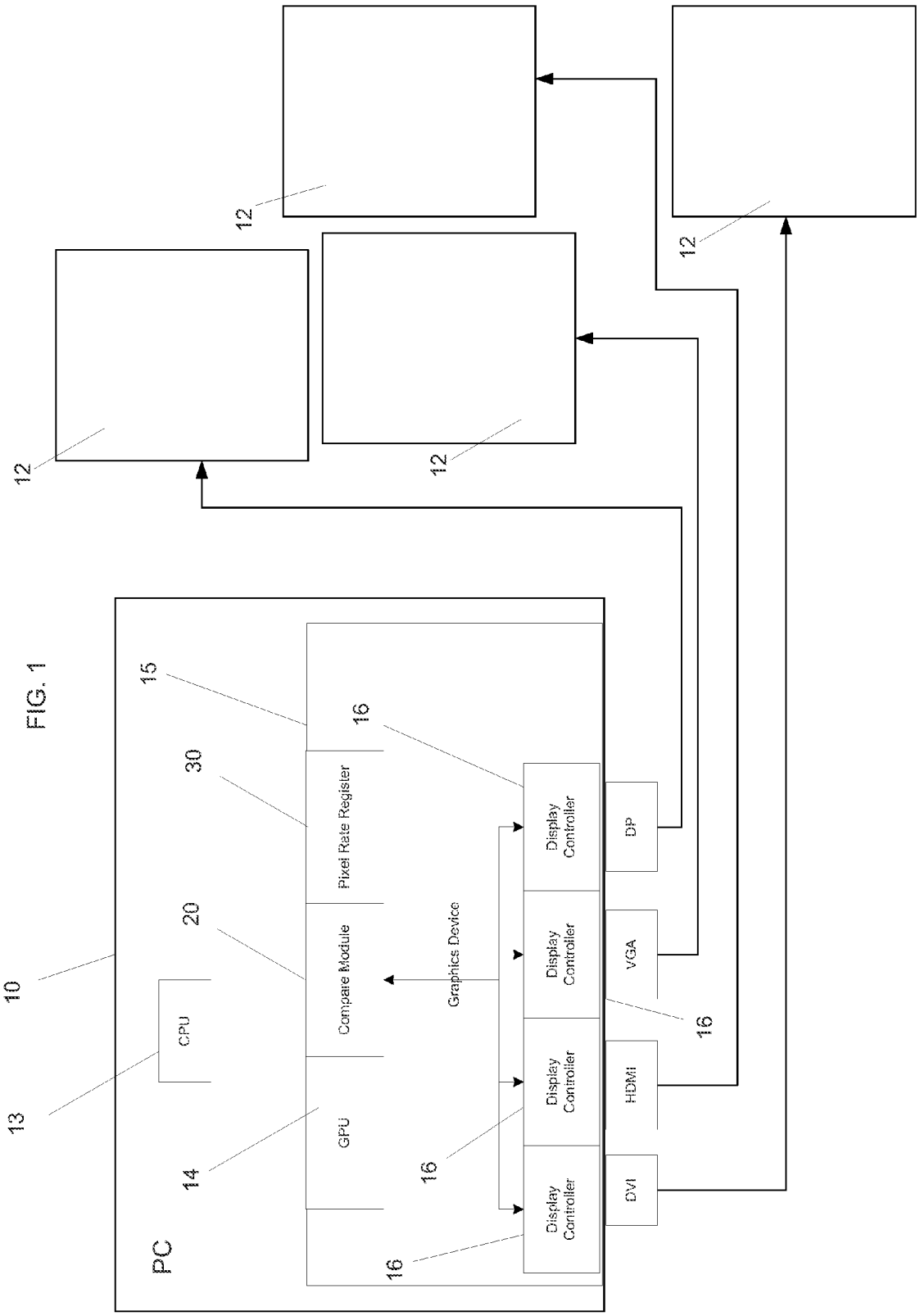
FIG. 1 is a diagram of a computing device providing synchronization between output video streams according to an embodiment of the present disclosure.

FIG. 1 shows architecture for providing digital video information from a device (PC 10) to multiple display panels 12. When supporting multiple display panels 12, a video stream is generated for each panel 12 via a display controller 16, block 310 of FIG. 2. In the creation of the video streams, the transport protocol (DVI, HDMI, DP, VGA) as well as the properties of the panel 12 are factored into the creation of the video stream. Each protocol and panel has specifications that define how the video stream should operate. The display controllers 16 utilize a rate generator (using phase-locked loop, data transfer object, or otherwise as appropriate). It should be appreciated that while a single video stream is shown for each display panel 12, embodiments are envisioned where multiple video streams are provided to a single display panel 12. For purposes of this disclosure, the multiple streams would operate on different stream specifications.

While the stream specifications state things such as refresh rate and resolution, the protocols and panels have a tolerance around the prescribed specification values that will still allow operation of panel 12 in a way that is acceptable to a user. Accordingly, for signals with a 60 Hz pixel rate specification, it is not uncommon to find signals actually operating at rates such as at 59.94 Hz or 59.95 Hz. As discussed previously, when viewed alone, panels 12 being supplied by signals operating at a 59.94 Hz (or 59.95 Hz) refresh rate are not distinguishable and do not provide a noticeable reduction in quality compared to the prescribed 60 Hz. However, when viewed simultaneously, after continuous operation over time, a signal at 59.94 Hz shows a noticeable lack of synchronicity with a signal at 59.95 Hz.

Device 10 includes CPU 13 that, during video setup, via a driver for a graphics board 15, finds the display path (including display controller 16) that exhibits a signal that most closely approximates a desired specification. This display path is chosen and designated as the "master" or "reference" path. Alternatively, CPU 13 chooses the display path having the most in common with other display paths as the master path. (For example, if there are four display paths, with one operating at 60 Hz, two operating at 59.95 Hz, and one operating at 59.94 Hz, one of the paths operating at 59.95 Hz may be used as the master.) In yet another alternative, choice of the master path is determined by the protocol being applied. For example, HDMI is most favored. Thus, if an HDMI protocol is to be used on one of the signal paths, the HDMI path is chosen as the master. Thus, for protocols, there is an established hierarchy to progress in the determination of the master path. An exemplary hierarchy is HDMI, DisplayPort, DVI, VGA. Regardless of the method, data streams are analyzed and compared via a compare module 20 (or otherwise), block 320 of FIG. 2, and a master stream is established, block 330 of FIG. 2.

Figure 2:
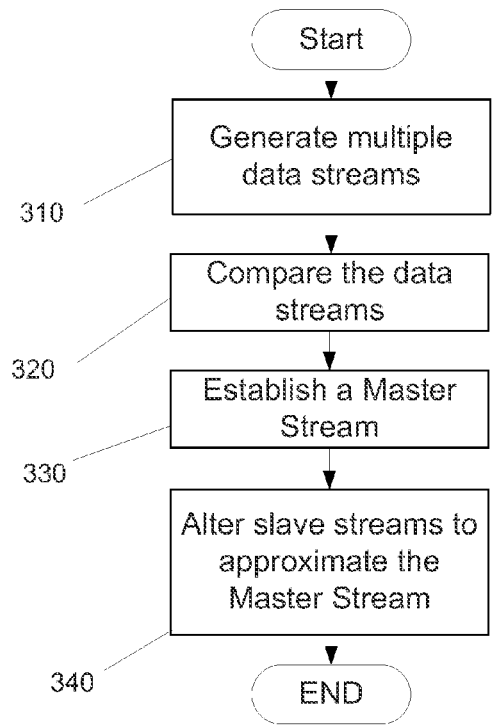
FIG. 2 is a flow chart showing exemplary operation of the computing device of FIG. 1 as it establishes synchronization between video streams in accordance with an embodiment of the present disclosure.

For each display path other than the designated master path, the associated rate generators of display controllers 16 are reprogrammed to approximately the rate of the master signal, block 340 of FIG. 2. This is achieved by CPU 13 writing to pixel rate register 30 of GPU 14 to modify the pixel rate. It should be appreciated that some signals may operate at rates that are very different. The functionality and "synchronization" described herein is operable to harmonize signals that operate reasonably close to one another. By way of example, the synchronization described herein is used to synchronize signals that are originally within 0.25% of each other. (Thus, if one signal is 60 Hz, other signals between 59.85 Hz and 60.15 Hz are suitable candidates for synchronization.) It should be appreciated that 0.25% is just an exemplary value. In fact, any two signals with differing refresh rates can be synchronized so long as it can be assured that the synchronization will not cause the altered signal to violate its specification (DVI, HDMI, DP, etc.) This concept creates a "master" stream and then one or more "slave" streams. The master stream remains unmodified, if possible. The slave streams are modified (adjusted) to fit the characteristics of the master stream, block 340 of FIG. 2.

While one embodiment uses the above master/slave implementation, embodiments are also envisioned where all streams are modified and forced to conform to a specification. One such example would be for all streams to be set at 60 Hz. Thus, one stream set at 60.14 Hz and one stream set at 59.86 Hz would both be set to 60 Hz. Individually, the two streams differ by just less than ½ of a percent. However, each stream would be moved less than ¼ of a percent. Again, it should be appreciated that the limit on how far a signal will be allowed to be moved is dictated by the ability to ensure that such movement will not violate the underlying specification for the signal. Additionally, embodiments are envisioned where synchronization is performed between streams having refresh rates operating at multiples of each other (signals at 60 Hz and 120 Hz).

Figure 4:
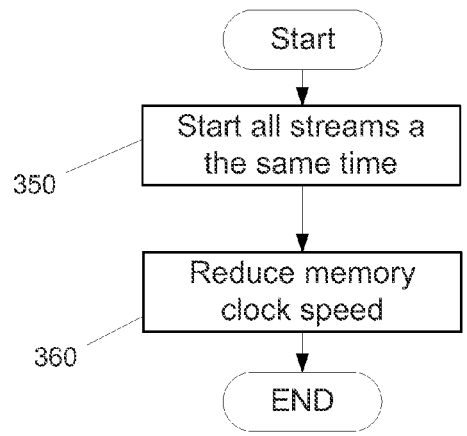
FIG. 4 is a flow chart showing exemplary operation of the computer of FIG. 1 as it initiates synchronized video streams in accordance with an embodiment of the present disclosure.

Once the refresh rates of the signals are harmonized, CPU 13 requires that the controllers 16 all start transmission at the same time, block 350 of FIG. 4. Thus, for a set of streams, it is known that they started at the same time and that they are progressing at the same rate. While the above causes all eligible controllers 16 to run at approximately the same rate, the rate may not be identical. Also, it is still possible that events that introduce occurrences of dis-synchronicity will happen.

As a display is rasterized to write a frame, such occurrences of dis-synchronicity (and the original dis-synchronicity) result in different pixels being drawn at the same time on respective panels 12. For so long as the dis-synchronicity is small, it is not very noticeable. Thus, in addition to providing that the signals start off in a synchronous fashion, hardware and software is provided that continue to check and ensure that the synchronicities are maintained.

Figure 3:
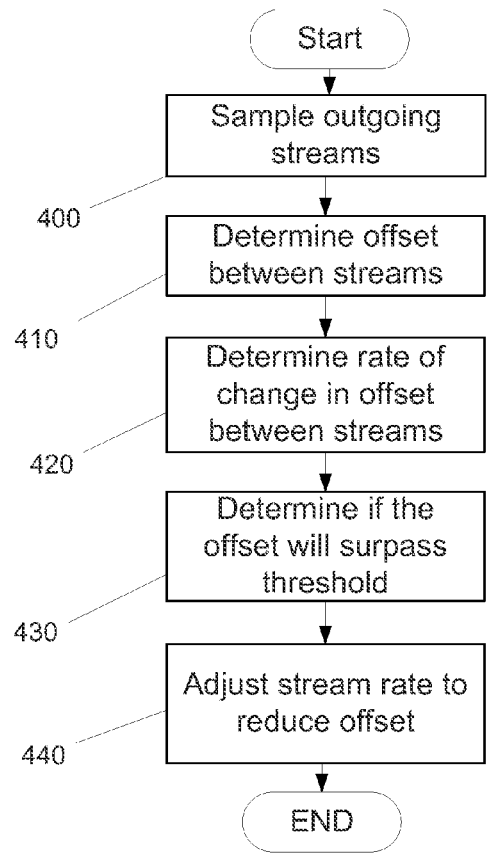
FIG. 3 is a flow chart showing exemplary operation of the computing device of FIG. 1 as it maintains synchronization between video streams in accordance with an embodiment of the present disclosure.

Thus, while the signals are active and running, the signals are monitored as indicated by block 400 of FIG. 3. In one embodiment, this monitoring takes the form of a thread. At a given point in time, the position of the master stream is determined along with the position of any slave streams. With respect to "position," one way of determining this includes determining which pixel is being output or written to a display at the given instant. The GPU monitors the position of each stream at multiple instances and determines differences (deltas) between each slave stream and the master stream. Once multiple stream positions over time are recorded, the data can be analyzed to determine any difference in position (in pixels) between streams, block 410 of FIG. 3, the speed of the change in the position difference (whether the difference is getting larger or smaller, and how fast), block 420 of FIG. 3, and an average acceleration of the change in the difference.

Given the computed information regarding the delta between streams, the controller of the slave stream operates to alter the slave stream to keep the difference between the slave stream and the master stream to be less than one line worth of pixels, block 430 of FIG. 3. If the slave stream gets ahead of the master stream, the rate of the slave stream is slightly lowered to slowly pull the slave stream back to the master stream, block 440 of FIG. 3. Likewise, if the slave stream gets behind the master stream, the rate of the slave stream is slightly raised to slowly push the slave stream back towards the master stream, block 440 of FIG. 3. Once the slave stream is pushed back into synchronicity (or apparent synchronicity) with the master stream, controller 16 for the slave stream again puts the stream at the approximately same rate as the master stream.

The delta between streams can also be determined a different way. If the display is to be refreshed 60 times per second, and there are 960 lines in a frame, then it should take approximately 1.7361e-5 seconds to write a line. For any given pixel, CPU 13 and display controller 16 alter the streams to ensure that the pixel is delivered to screens (or at least graphics card outputs) of master and slave within 1.7361e-5 seconds of each other. Regardless of how it is calculated, the concept is the same. Furthermore, the use of "one line" as the boundary can be adjusted as desired if it is found that greater tolerances are permissible.

Additionally, if the signals are synchronized, then the rate of sampling can likewise be lowered, block 360 of FIG. 4. Video signals have active periods and blank periods. Samplings need to read from the active periods, but not the blank periods. With synchronized signals, the blank periods are also synchronized such that clock speeds during blank periods can be lowered without concern that needed data will be missed. Without synchronized signals, the sampling rate must be maintained at the high rate because at least one of the signals is likely to be in an active region at any given time. By lowering the sampling rate (memory clock), this process requires less resources from CPU 13 and PC 10 generally. The embodiments herein thus provide energy savings for mobile devices, battery powered devices, and otherwise.

The above provides synchronization regardless of the size of the timing frame, pixel clock, spread spectrum settings and color depth. It should be further appreciated that the above system is self-stabilizing. It should also be appreciated that if synchronization of all streams is not possible, embodiments are envisioned where sub-groups are created in which sets of synchronize-able streams are synchronized while the sub-groups are not synchronized with each other.

The above detailed description and the examples described herein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, software and circuits described herein may also be produced as integrated circuits by such systems using the computer readable medium with instructions stored therein. For example, an integrated circuit with the aforedescribed software, logic and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of providing data output including:
   generating a first data stream and a second data stream, the streams being generated by a first device having a processor and first and second rate generators, the first data stream following a first protocol and being governed by the first rate generator and the second data stream following a second protocol that is different from the first protocol, the second data stream being governed by the second rate generator;
   outputting said first and second streams; and
   subsequent to the outputting, writing to a pixel rate register to adjust a setting of one of the first and second rate generators to adjust a rate at which pixels are generated thereby to cause a reduction in any temporal offset between first data in the first stream and the first data in the second stream.

2. The method of claim 1, wherein both the first and second data streams transmit the same data.

3. The method of claim 1, further including:
   obtaining the first data stream in a first format having a first clock speed;
   obtaining the second data stream in a second format having a second clock speed that is different than the first clock speed; and
   adjusting the second clock speed to approximate the first clock speed.

4. The method of claim 3, further including causing the first data stream and second data stream to begin transmission simultaneously.

5. The method of claim 3, wherein the first and second data streams are video streams.

6. The method of claim 5, wherein the first and second streams each follow different protocols selected from the group of HDMI, DVI, DisplayPort, and VGA.

7. The method of claim 3, further including determining if the first clock speed is within a predetermined range of the second clock speed and only adjusting the rate of the second data stream if the first clock speed is within a predetermined range of the second clock speed.

8. The method of claim 1, further including:
   determining if the temporal offset is of a magnitude that causes one of the first and second streams to output both a first line and second line before the other of the first and second streams outputs the first line.

9. The method of claim 1, further determining if the temporal offset equates to an offset of a number of pixels greater than the number of pixels in a row of a frame of the first data.

10. The method of claim 1, further including receiving the first data stream, receiving the second data stream, displaying the first data stream, and displaying the second data stream.

11. The method of claim 10, wherein the first data stream is displayed on a first display and the second data stream is displayed on a second display.

12. The method of claim 1, further including comparing, by the processor, the first data stream to the second data stream to determine the degree to which transmission of the streams is temporally offset.

13. The method of claim 12, wherein comparing the first data stream to the second data stream includes multiple samplings that provide data indicating whether the temporal offset between the first and second streams is increasing or decreasing.

14. The method of claim 13, further including determining that the first and second data streams, given their current settings, are within a threshold time of having a first condition where one of the first and second streams outputs both a first line and second line before the other of the first and second streams outputs the first line, the threshold time being a value greater than zero.

15. The method of claim 14, wherein the second data rate is adjusted in response to determining that the first and second data streams are within the threshold time of having the first condition.

16. The method of claim 1, wherein adjusting of the data rate of the second data is performed while the first and second streams are being output.

17. The method of claim 1, further including determining the temporal offset between outputs of the first and second data streams, and the second data rate is adjusted in response to the determined offset between output of the first and second data streams.

18. An apparatus including:
a processor operable to generate and output a first data stream sending first data and to generate a second data stream sending the first data, the first data stream at least partially defined by a setting of a first display controller and following a first protocol and the second data stream at least partially defined by a setting of a second display controller and following a second protocol that is different from the first protocol; and
the second display controller operable to write to a pixel rate register to adjust a rate at which pixels are generated in the second data stream subsequent to a start of outputting of the second data stream to cause a reduction in any temporal offset of the first data between the streams.

19. The apparatus of claim 18, further including:
a first display controller operable to provide the first data stream in a first format having a first clock speed; the second display controller operable to provide the second data stream in a second format having a second clock speed that is different than the first clock speed.

20. The apparatus of claim 18, wherein the first and second display controllers each output data streams that follow different protocols selected from the group of HDMI, DVI, DisplayPort, and VGA.

21. The apparatus of claim 18, wherein the processor is further operable to determine if the temporal offset equates to an offset of a number of pixels greater than the number of pixels in a row of a frame of the first data.

22. The apparatus of claim 18, wherein the processor and second display controller are part of battery powered device.

23. The apparatus of claim 18, wherein the processor is further operable to compare the first data stream to the second data stream to determine the degree to which transmission of the first data in each of the streams is temporally offset.

24. The apparatus of claim 23, wherein the processor is further operable to compare the first data stream to the second data stream to obtain multiple samplings of the first and second data streams, the processor being further operable to compare the samplings to determine whether the temporal offset between the first and second streams is increasing or decreasing.

25. The apparatus of claim 18, wherein the second display controller is operable to adjust the data rate of the second data stream while the data stream is being output.

26. The apparatus of claim 18, wherein the second display controller is operable to adjust the data rate of the second data stream in response to determining that outputs of the first and second streams are offset by a first amount.

27. A non-transitory computer readable medium containing instructions thereon, that when interpreted by at least one processor cause the at least one processor to:
compare a first data stream sending first data to a second data stream sending the first data to determine the degree to which transmission of the first data in each of the streams is temporally offset, the first data stream being at least partially defined by a setting of a first rate generator and following a first protocol and the second data stream following a second protocol that is different from the first protocol, the second stream being at least partially defined by a setting of a second rate generator; and
adjust a setting of the second rate generator by writing to a pixel rate register to adjust a rate at which pixels are generated in the second data stream to cause a reduction in any temporal offset between the streams.

28. The computer readable medium of claim 27, wherein the instructions further cause the processor to:
generate a first data stream sending first data and a second data stream sending the first data;
compare the first data stream to the second data stream to determine the degree to which transmission of the first data in each of the streams is temporally offset; and
adjust a data rate of the second data stream to cause a reduction in any temporal offset between the streams.

29. The computer readable medium of claim 27, wherein the instructions further cause the processor to:
determine whether the temporal offset between the first and second streams is increasing or decreasing.

30. The computer readable medium of claim 27, wherein the instructions are embodied in hardware description language suitable for one or more of describing, designing, organizing, fabricating or verifying hardware.

* * * * *